United States Patent
Browne et al.

(10) Patent No.: US 7,607,634 B2
(45) Date of Patent: Oct. 27, 2009

(54) SHAPE MEMORY POLYMER CONDUITS AND METHODS OF USE

(75) Inventors: Alan L. Browne, Grosse Pointe, MI (US); Norman K. Bucknor, Troy, MI (US); Michael R. Leslie, Grosse Pointe Park, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 517 days.

(21) Appl. No.: 11/068,028

(22) Filed: Feb. 28, 2005

(65) Prior Publication Data

US 2005/0202194 A1 Sep. 15, 2005

Related U.S. Application Data

(60) Provisional application No. 60/552,795, filed on Mar. 12, 2004.

(51) Int. Cl.
*F16K 7/04* (2006.01)

(52) U.S. Cl. ................. 251/4; 251/129.01; 251/129.06; 138/46

(58) Field of Classification Search .............. 251/4, 251/11, 129.01, 129.06; 138/46
See application file for complete search history.

(56) References Cited

U.S. PATENT DOCUMENTS

| | | | |
|---|---|---|---|
| 4,805,618 A * | 2/1989 | Ueda et al. ................. 128/831 |
| 5,560,541 A | 10/1996 | Warshawsky et al. | |
| 5,584,432 A | 12/1996 | Lockhart | |
| 5,647,530 A | 7/1997 | Lorch | |
| 6,135,311 A * | 10/2000 | Panec et al. ................. 220/705 |
| 6,260,818 B1 * | 7/2001 | Grummon ....................... 251/4 |
| 6,358,238 B1 * | 3/2002 | Sherry ......................... 604/524 |
| 6,370,757 B2 * | 4/2002 | Lee et al. ....................... 29/447 |
| 6,565,526 B2 * | 5/2003 | Seward .................... 604/93.01 |
| 6,663,821 B2 * | 12/2003 | Seward ........................ 264/512 |
| 6,742,503 B2 * | 6/2004 | Feucht ......................... 123/446 |
| 6,991,617 B2 * | 1/2006 | Hektner et al. ......... 604/103.01 |
| 2003/0127413 A1 | 7/2003 | Spinelli et al. | |

FOREIGN PATENT DOCUMENTS

| | | |
|---|---|---|
| EP | 0 691 494 B1 | 1/1996 |
| GB | 2278051 A | 11/1994 |
| GB | 2311119 A | 9/1997 |
| WO | WO 96/34325 | 10/1996 |

OTHER PUBLICATIONS

EP0691494; Jan. 10, 1996; Abstract Only (1 pg).

* cited by examiner

*Primary Examiner*—John K Fristoe, Jr.

(57) ABSTRACT

A method comprises applying a thermal activation signal to a conduit comprising a shape memory polymer, causing a change in at least one property of the shape memory polymer, and regulating fluid flow through the conduit by the change in the at least one property of the shape memory polymer. A conduit comprises a shape memory polymer in an amount effective to regulate fluid flow through the conduit by a change in at least one property of the shape memory polymer caused by application of a thermal activation signal. The conduits and methods disclosed herein may find use as drinking utensils, respirator tubes, pump intake tubes, motor vehicle cooling system bypass hoses, motor vehicle engine oil filter bypass hoses, or motor vehicle powertrain fluid circulation hoses.

5 Claims, 1 Drawing Sheet

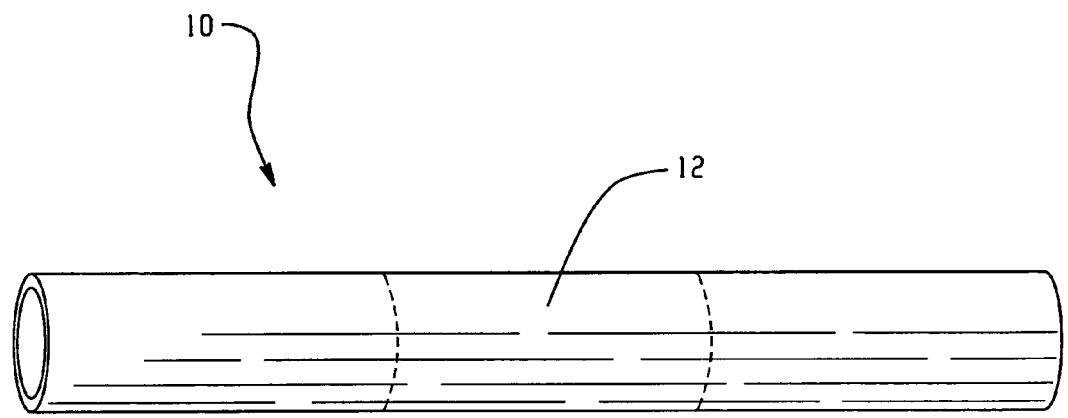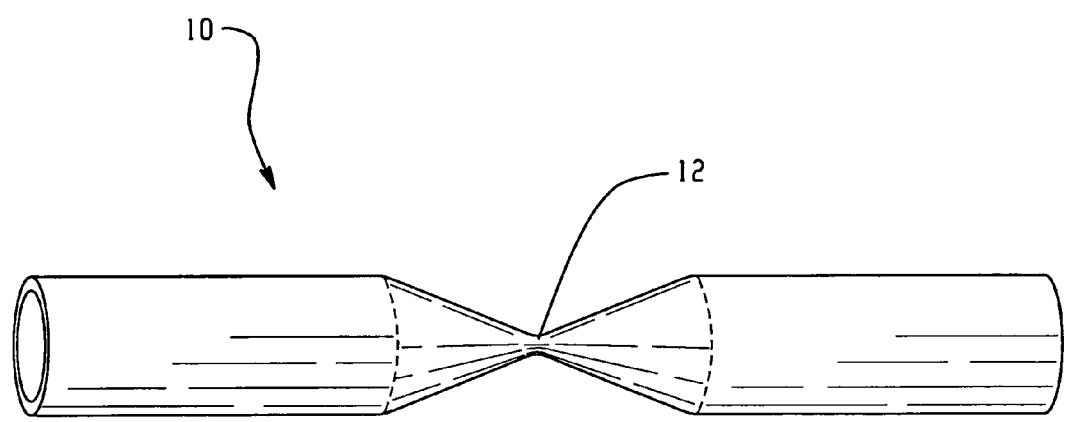

SHAPE MEMORY POLYMER CONDUITS AND METHODS OF USE

CROSS REFERENCE TO RELATED APPLICATIONS

The present application claims priority to U.S. Provisional Patent Application No. 60/552,795 filed on Mar. 12, 2004.

BACKGROUND

The present disclosure generally relates to conduits, and more particularly, to conduits formed of a shape memory polymer and methods of use.

Numerous fluid distribution systems, such as water or gas lines, employ at least one valve for regulating fluid flow. The valve may be interposed between a fluid source and a conduit, between a conduit and a fluid distribution destination, between the fluid source and the fluid distribution destination, or between two conduits. The valve may also provide a safety mechanism in case of an unintentional emergency, such as a portion of the fluid flow system leaking or in case a pressure and/or temperature exceeds a threshold. Very often, in order to regulate fluid flow the valve must be manually (e.g., by a human) or remotely (e.g., electronically) operated upon.

These fluid distribution systems are limited in that the process of manually operating a valve may be difficult for those who may not be familiar with the valve design or movement direction required to control the valve. Under these circumstances, response time is increased and may be non-optimal. This problem may be exacerbated if the valve is stuck. One limitation of fluid distribution systems including remotely operated valves is that additional expenses for equipment, such as a computer, are necessary.

Recently, as alternatives to traditional valves, valves based on shape memory alloys (SMA) have been employed in fluid distribution systems. These valves desirably provide greater sensitivity and quicker response times than traditional valves. However, some drawbacks associated with SMA actuated valves are that they may be complex in design and significantly more expensive to manufacture than traditional valves. Furthermore, like traditional valves, some SMA actuated valves require manual resetting, have mechanical parts that may fail over time, have metal components that may corrode over time, and may themselves leak.

Therefore, despite their suitability for their intended purposes, there nonetheless remains a need in the art for fluid distribution systems with greater ease of fluid flow regulation. It would be particularly advantageous if these systems were less expensive to manufacture, less complex in their design, and reduced or eliminated the number of components.

BRIEF SUMMARY

Disclosed herein is a method comprising applying a thermal activation signal to a conduit comprising a shape memory polymer; causing a change in at least one property of the shape memory polymer; and regulating fluid flow through the conduit by the change in the at least one property of the shape memory polymer.

A conduit comprises a shape memory polymer in an amount effective to regulate fluid flow through the conduit by a change in at least one property of the shape memory polymer caused by application of a thermal activation signal.

A drinking utensil comprises a shape memory polymer in an amount effective to regulate flow of a drinkable fluid through the drinking utensil by a change in at least one property of the shape memory polymer caused by application of a thermal activation signal.

In another embodiment, a drinking utensil comprises an open ended body, wherein the open ended body includes a fluid inlet at one end, and a fluid outlet at an other end, wherein at least a portion of the open ended body is formed of a shape memory polymer.

A bypass hose of a motor vehicle cooling system comprises a shape memory polymer in an amount effective to regulate flow of a cooling system fluid through the motor vehicle cooling system bypass hose by a change in at least one property of the shape memory polymer caused by application of a thermal activation signal.

A motor vehicle bypass hose between an oil pump and a filter comprising a shape memory polymer in an amount effective to regulate flow of engine oil through the motor vehicle engine oil filter bypass hose by a change in at least one property of the shape memory polymer caused by application of a thermal activation signal.

A motor vehicle conduit for circulating powertrain fluids, the conduit comprising a shape memory polymer in an amount effective to regulate a flow of the powertrain fluid by a change in at least one property of the shape memory polymer in response to a thermal activation signal.

The above described and other features are exemplified by the following FIGURES and detailed description.

BRIEF DESCRIPTION OF THE DRAWINGS

Referring now to the FIGURE, which is an exemplary embodiment and wherein like elements are numbered alike:

The FIGURE is a schematic representation of a section of a conduit in open and constricted relationships.

DETAILED DESCRIPTION

Methods and conduits for regulating fluid flow in fluid distribution systems are disclosed herein. In contrast to the prior art, the conduits and methods disclosed herein advantageously are based on shape memory polymers (SMP), which exhibit a change in at least one property, such as elastic modulus, a shape, a dimension, a shape orientation, a phase of matter, or a combination comprising at least one of the foregoing properties upon application of a thermal activation signal.

As used herein, the term "conduit" refers to any device in which a fluid may flow from a first location to a second location and may be of any size or shape. The term "fluid" is used herein for convenience and refers generically to any liquid, solution, suspension, gas, or combination comprising at least one of the foregoing.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. Furthermore, all ranges disclosed herein are inclusive of the endpoints and independently combinable.

In one embodiment, the method comprises applying the thermal activation signal to the conduit, and regulating fluid flow through the conduit by collapsing or expanding the conduit.

In one embodiment, the conduit comprises a shape memory polymer in an amount effective to regulate fluid flow through the conduit by collapsing or expanding the conduit upon application of the thermal activation signal. In another embodiment, the conduit consists essentially of a shape memory polymer, wherein fluid flow through the conduit is regulated by collapsing or expanding the conduit upon application of the thermal activation signal.

The thermal activation signal comprises heating the conduit to a temperature greater than or equal to a selected temperature (e.g., a temperature greater than a glass transition temperature of at least one segment of the shape memory polymer). Heating the conduit may comprise thermodynamic heat transfer from the fluid, flowing through the conduit or immersed therein, to an internal or external portion comprising the SMP of the conduit. Heating of the conduit may also be by resistive heating (for example by sending current through wires embedded in the SMP portion), radiative heat transfer, microwave heating, heating due to an exothermic chemical reaction, or any combination of two or more of these means.

Desirably, the change in the property of the SMP remains for the duration of the applied thermal activation signal. Also desirably, upon discontinuation of the thermal activation signal, which comprises the conduit attaining a temperature below the selected temperature, the property, e.g., the elastic modulus of the SMP,—reverts substantially to its original value prior to the change.

In one embodiment, collapsing the conduit results in decreased fluid flow through the conduit. Alternatively, collapsing the conduit results in no fluid flow through the conduit. In another embodiment, expanding the conduit results in increased fluid flow through the conduit.

The FIGURE depicts a section of a conduit 10 in open and constricted relationships. Fluid flow through the section of the conduit 10 may be assisted or induced by vacuum or pressure flow. Under vacuum-induced fluid flow (VIFF) conditions, the conduit 10 generally acts as a "hot" (i.e., greater than or equal to the selected temperature) fluid restrictor. In this case the "memorized" shape of the SMP (that to which it returns when hot and at ambient pressure) is an open as opposed to constricted conduit. Below the selected temperature, the conduit 10 is in an open configuration, which allows free flow of the fluid through the conduit 10. When the fluid attains a temperature sufficient to heat a portion of the conduit comprising the SMP 12 to the selected temperature, a change in the property of the SMP is effected. When the change in the property of the SMP is effected, the portion of the conduit comprising the SMP 12 collapses under vacuum to a constricted position, which results in decreased or no fluid flow through conduit 10. If the vacuum is subsequently turned off (such as by shutting off the engine) while the fluid and thus conduit remains hot, the portion of the conduit comprising the SMP 12 expands owing to a shape memory effect, returning conduit 10 substantially to the open configuration, which again allows free fluid flow through the conduit 10. Subsequent cooling of the fluid will cause a reversal in the temperature induced change in the SMP (i.e. an increase in elastic modulus). An alternative means of reopening the collapsed conduit while still hot is to switch to a pressurized flow, for example to switch to blowing through the hot contracted SMP straw after first collapsing it by "sucking".

Alternatively, under pressure-induced fluid flow (PIFF) conditions, the conduit 10 generally acts as a "cold" (i.e., less than or equal to the selected temperature) fluid restrictor. In this case the "memorized" shape of the SMP (that to which it returns when heated and at ambient pressure) is a constricted as opposed to open conduit. Below the selected temperature, the conduit 10 is in a constricted configuration, which minimizes or prevents free flow of the fluid through the conduit 10. When the fluid attains a temperature sufficient to heat a portion of the conduit comprising the SMP 12 to the selected temperature, a change in the property of the SMP is effected. When the change in the property of the SMP is effected, the portion of the conduit comprising the SMP 12 expands if the fluid is under pressure to an open configuration, which results in free fluid flow through conduit 10. If the pressure is subsequently turned off (such as by shutting off the engine) while the fluid and thus the conduit remains hot, the portion of the conduit comprising the SMP 12 constricts owing to the shape memory effect, returning conduit 10 substantially to the constricted configuration. Subsequent cooling of the fluid will cause a reversal in the temperature induced change in the SMP (i.e. an increase in elastic modulus). It should be noted that the conduit can be formed entirely from the shape memory polymer or, alternatively, have a portion of the conduit formed from the shape memory polymer as shown in the FIGURE. To maximize effectiveness, the portion of the conduit formed of the shape memory polymer 12 desirably represents at least a cross-section of conduit 10 (i.e., forms a conduit when taken by itself). The portion of the conduit that is not formed of shape memory polymer, if applicable, can be formed of any material as would be apparent to those skilled in the art, (e.g., rubber, plastics, metals, alloys, or the like).

In one VIFF hot fluid restrictor embodiment, the conduit is a drinking utensil and aids in the prevention of scalding to the end user. Suitable drinking utensils include straws (including design and aesthetic straws), nipples, bottle or thermos flip-top openings, squeeze-bottle snap-openings, hollow stirrers, cup sip-lids, and the like. In this embodiment, the drinking utensil's rest position, such as when the drinking utensil is not in contact with the drinkable fluid, is the open configuration. When the fluid increases in temperature such that the drinking utensil attains a temperature above the selected temperature, the drinking utensil collapses under the partial vacuum induced by sucking to the constricted configuration and decreases or prevents the drinkable fluid from flowing through the drinking utensil and into a person's mouth. In this manner, fluid flow to the end user is substantially or completely prevented so as to prevent scalding. The drinking utensil may be returned to the open configuration by either discontinuing sucking or drinking, or more rapidly by blowing air back through the drinking utensil, either action being done while it is still hot.

In another VIFF hot fluid restrictor embodiment, the conduit is a pump inlet or intake tube and aids in the prevention of introducing hot fluids into the pump. In this embodiment, the inlet tube's rest position, such as when the pump is off, is the open configuration. When a fluid increases in temperature such that the inlet tube attains a temperature above the selected temperature, the inlet tube collapses under vacuum into the constricted configuration and decreases or prevents the fluid from flowing through the inlet tube and subsequently into the pump. The inlet tube may be returned to the open configuration by shutting off the pump while the fluid is still hot or reversing the direction of the pump to create a pressurized flow of the hot fluid.

In one PIFF cold fluid restrictor embodiment, the conduit is a motor vehicle (i.e., automobile, airplane, motorcycle, over the highway tractor, snowmobile, all terrain vehicle, boat, spaceship, or the like) cooling system bypass hose. These conduits may be used in transmission fluid-, engine oil-, engine coolant-, or the like-cooling systems that make use of a bypass valve, and may be used in place of, or in addition to, the bypass valve. In this embodiment, the cooling system bypass hose's rest position, such as when the motor vehicle is off, is the constricted configuration, which prevents or minimizes the flow of cooling system fluid (e.g., transmission fluid, engine oil, or engine coolant) into a main cooling system circulation path. When the cooling system fluid increases in temperature such that the bypass hose attains a temperature above the selected temperature, the bypass hose expands under pressure and allows the cooling system fluid to flow through the bypass hose and into the main cooling system circulation path. The cooling system bypass hose may be returned to the closed configuration when the cooling system fluid is still hot but no longer pressurized, such as soon after the motor vehicle is shut off. Subsequent cooling of the fluid will reverse the property change (increase the modulus) of the SMP conduit.

In another PIFF cold fluid restrictor embodiment, the conduit is a motor vehicle engine oil filter bypass hose. These conduits may be used in place of, or in addition to, an oil filter bypass valve. In this embodiment, the oil filter bypass hose's rest position, such as when the motor vehicle is off, is the constricted configuration, which prevents or minimizes the flow of cool, viscous engine oil into the oil filter. When the engine oil increases in temperature such that the bypass hose attains a temperature above the selected temperature, the bypass hose expands (due to a drop in modulus of the SMP) and allows the heated, less viscous engine oil to flow through the oil filter to lubricating points. The oil filter bypass hose may be returned to the closed configuration when the now hot engine oil is no longer pressurized, such as soon after the motor vehicle has been shut off.

In one pressure and vacuum induced fluid flow hot fluid restrictor embodiment, the conduit is a respirator tube and aids in the prevention of breathing dangerously hot air. In this embodiment, the conduit's rest position (such as when the respirator is off) is the open configuration. When the air increases in temperature such that the respirator tube attains a temperature above the selected temperature, the respirator tube collapses under the induced partial vacuum to the constricted configuration and decreases or prevents the air from being drawn (inhaled) through it and into a person's lungs. The respirator tube will remain in the closed configuration until the vaccum no longer exists but the SMP is still hot, at which time it will again return to the open configuration and permit air to be drawn (inhaled) through it.

Generally, SMPs are co-polymers comprising at least two different units which may be described as defining different segments within the co-polymer, each segment contributing differently to the elastic modulus properties and thermal transition temperatures of the material. "Segment" refers to a block, graft, or sequence of the same or similar monomer or oligomer units which are copolymerized to form a continuous crosslinked interpenetrating network of these segments. These segments may be crystalline or amorphous materials and therefore may be generally classified as a hard segment(s) or a soft segment(s), wherein the hard segment generally has a higher glass transition temperature (Tg) or melting point than the soft segment.

Each segment then contributes to the overall flexural modulus properties of the shape memory polymer (SMP) and the thermal transitions thereof, the hard segments tending to increase and the soft segments tending to decrease both the flexural modulus properties and the temperatures associated with their changes. When multiple segments are used, multiple thermal transition temperatures may be observed, wherein the thermal transiton temperatures of the copolymer may be approximated as weighted averages of the thermal transiton temperatures of its comprising segments.

The previously defined or permanent shape of an SMP can be set by melting or processing the polymer at a temperature higher than the highest thermal transition temperature for the shape memory polymer or its melting point, followed by cooling below that thermal transition temperature. The temperature necessary to set the permanent shape is preferably between about 100° C. to about 300° C. A temporary shape can be set by heating the material to a temperature higher than any Tg or thermal transition temperature of the shape memory polymer, but lower than the highest Tg or its melting point. The temporary shape is set by applying an external stress or load while processing the material above the Tg, but below the highest thermal transition temperature or melting point of the shape memory material followed by cooling to fix the shape.

The material can then be reverted to the permanent shape by heating the material, with the stress or load removed, above its Tg but below the highest thermal transition temperature or melting point. Thus, by combining multiple soft segments it is possible to demonstrate multiple temporary shapes and with multiple hard segments it may be possible to demonstrate multiple permanent shapes. Similarly using a layered or composite approach, a combination of multiple SMPs will demonstrate transitions between multiple temporary and permanent shapes.

At the soft segment transition temperature (also termed "first transition temperature"), the temporary shape of the shape memory polymer is set followed by cooling of the shape memory polymer, while still under load, to lock in the temporary shape. The temporary shape is maintained as long as it remains below the soft segment transition temperature. The permanent shape is regained when the shape memory polymer fibers are once again brought to or above the transition temperature of the soft segment. Repeating the heating, shaping, and cooling steps can reset the temporary shape. The soft segment transition temperature can be chosen for a particular application by modifying the structure and composition of the polymer. Transition temperatures of the soft segment range from about −63° C. to above about 160° C.

Shape memory polymers may contain more than two transition temperatures. A shape memory polymer composition comprising a hard segment and two soft segments can have three transition temperatures: the highest transition temperature for the hard segment and a transition temperature for each soft segment.

Most shape memory polymers exhibit a "one-way" effect, wherein the shape memory polymer exhibits one permanent shape. Upon heating the shape memory polymer above the first transition temperature with the stress or load removed, the permanent shape is achieved and the shape will not revert back to the temporary shape without the use of outside forces.

As an alternative, some shape memory polymer compositions can be prepared to exhibit a "two-way" effect. These systems consist of at least two polymer components. For example, one component could be a first cross-linked polymer while the other component is a different cross-linked polymer. The components are combined by layer techniques, or are interpenetrating networks, wherein two components are cross-linked but not to each other. By changing the temperature, the shape memory polymer changes its shape in the direction of the first permanent shape of the second permanent shape. Each of the permanent shapes belongs to one component of the shape memory polymer. The two permanent shapes are always in equilibrium between both shapes. The temperature dependence of the shape is caused by the fact that the mechanical properties of one component ("component A") are almost independent from the temperature in the temperature interval of interest. The mechanical properties of the other component ("component B") depend on the temperature. In one embodiment, component B becomes stronger at low temperatures compared to component A, while component A is stronger at high temperatures and determines the actual shape. A two-way memory device can be prepared by setting the permanent shape of component A ("first permanent shape"); deforming the device into the permanent shape of component B ("second permanent shape") and fixing the permanent shape of component B while applying a stress to the component.

SMP can be configured in many different forms and shapes. The temperature needed for permanent shape recovery can be set at any temperature between about −63° C. and about 160° C. or above. It should be apparent to those skilled in the art that engineering the composition and structure of the polymer itself can allow for the choice of the selected temperature for a desired application. For example, the selected temperature in a drinking utensil or respirator to be used by an infant will desirably be lower than for a drinking utensil or respirator used by an adult.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsesquioxane), polyvinyl chloride, urethane/butadiene copolymers, polyurethane block copolymers, styrene-butadiene-styrene block copolymers, and the like, and combinations comprising at least one of the foregoing polymer components. Examples of suitable polyacrylates include poly(methyl methacrylate), poly(ethyl methacrylate), ply(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate).

Advantageously, the conduits described herein are less complicated compared to conventional fluid distribution systems and eliminate or reduce the need for valves. In addition to providing reversibility, it should be recognized by those skilled in the art that the SMP-based conduits as disclosed herein are relatively quick responding, inexpensive to manufacture, easy to use, and good regulators of fluid flow.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. An intermediate conduit section formed of a single layer wall, presenting a first longitudinal profile and a first open cross-sectional flow area, and comprising a shape memory polymer in an amount effective to reconfigure the profile and area so as to present a second profile and open area and thereby regulate fluid flow through the conduit section, by a change in at least one property of the shape memory polymer caused by application of a thermal activation signal.

2. The conduit section of claim 1, wherein the shape memory polymer comprises polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsesquioxane), polyvinyl chloride, urethane/butadiene copolymers, polyurethane block copolymers, styrene-butadiene-styrene block copolymers, and combinations comprising at least one of the foregoing.

3. The conduit section of claim 1, wherein the change in at least one property comprises a change in elastic modulus, a shape, a dimension, a shape orientation, a phase of matter, or a combination comprising at least one of the foregoing properties.

4. The conduit section of claim 1, wherein regulating fluid flow through the conduit section includes collapsing or expanding the conduit section.

5. A drinking utensil including a cylindrical section presenting a first longitudinal profile and a first open cross-sectional flow area and comprising a shape memory polymer in an amount effective to reconfigure the profile and area so as to present a second profile and open area and thereby regulate flow of a drinkable fluid through the drinking utensil, by a change in at least one property of the shape memory polymer caused by application of a thermal activation signal.

* * * * *